May 29, 1962 H. A. KULJIAN 3,036,911
REVERBERATORY FURNACE
Filed Sept. 3, 1959 2 Sheets-Sheet 1
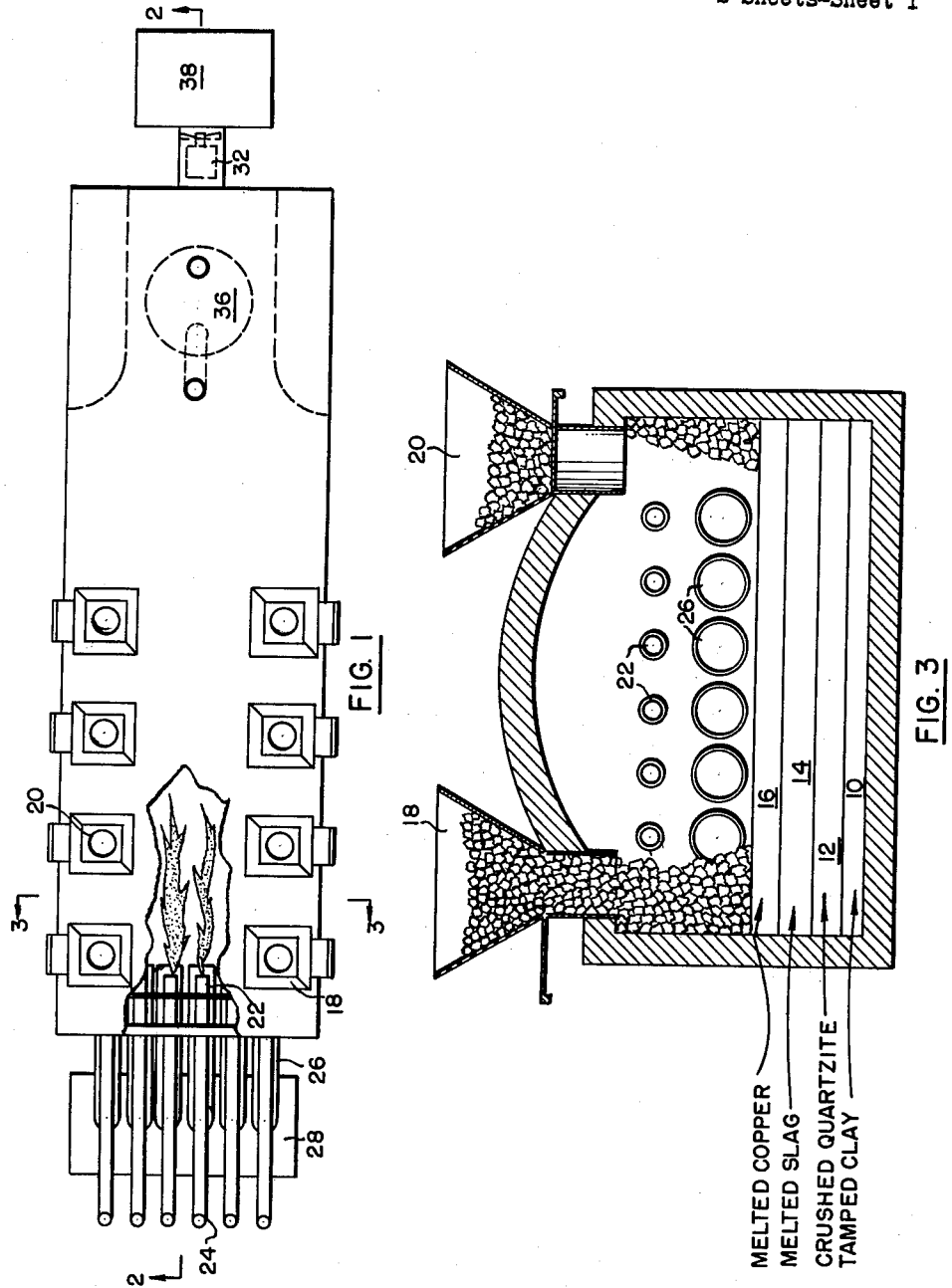
INVENTOR.
HARRY A. KULJIAN
BY
ATTORNEY

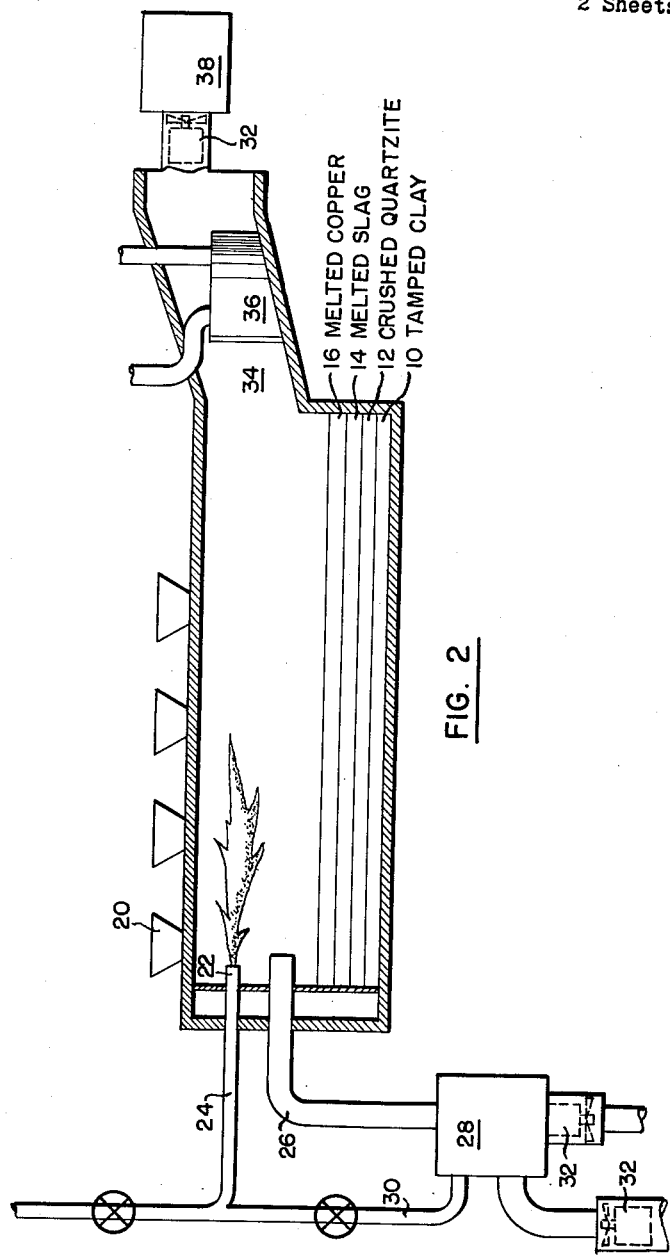

3,036,911
REVERBERATORY FURNACE
Harry Asdour Kuljian, Merion, Pa.
(1200 N. Broad St., Philadelphia 2, Pa.)
Filed Sept. 3, 1959, Ser. No. 837,891
1 Claim. (Cl. 75—92)

Reverberatory furnaces are used for smelting copper, and other comparable metals, and they include an elongated ore receiving and melting chamber, means for admitting a mixture of preheated combustion air and fuel into the furnace, and means for utilizing the heat component of the flue gases to produce steam and to preheat the combustion. Furnaces of this type are very large and continuous operation is mandatory if their operation is to be efficient and profitable.

The combustion air preheater of a conventional economically feasible reverberatory furnace is about 50 square feet in area and about 140 feet in length, and the cost of building, supporting and maintaining this structure is very large. Furthermore, because the temperature of the air preheater tubes can rise up to about 1085° F. and, because the temperature of the flue gases coming in contact with the preheater tubes is about 1700° F., the soft or semi-melted particles of copper carried by the flue gases settle on, and adhere to, air preheater tubes. Because the cost of shutting down the furnace while the preheater tubes are being cleaned is prohibitive, it has heretofore been the practice to provide two air preheaters so that one of them will be available while the other is being cleaned. While this is less expensive than shutting down the furnace, it, nevertheless represents great expense.

One object of this invention is to produce an improved reverberatory furnace of the type set forth.

A further object of the invention is to produce an improved reverberatory furnace which dispenses with combustion air preheaters altogether and which operates at a greater over-all efficiency.

According to my invention, I use a relatively large boiler to extract the optimum amount of heat from the flue gases and I provide a separate direct-fired heater to preheat the combustion air.

The full nature of the invention will be understood from the following specification and the accompanying drawings in which:

FIG. 1 is a diagrammatic top plan view of a reverberatory furnace embodying my invention.

FIG. 2 is an enlarged, sectional view looking in the direction of line 2—2 on FIG. 1.

FIG. 3 is a diagrammatic sectional view looking in the direction of line 3—3 on FIG. 1.

A conventional reverberatory furnace includes a fire chamber, the bottom of which is lined with a layer of tamped clay 10; a layer of crushed quartzite 12 and a layer of melted slag 14 above which is the melted copper 16. It will be understood that the melted copper and slag are drained off, separately, and at suitable intervals through conventional means, not shown.

The ore is fed through hoppers 18 and 20 which are distributed over about half of the length of the furnace and are disposed on either side of the furnace whereby the ore to be smelted is admitted along the longitudinal sides of the furnace.

One end of the furnace is provided with a number of burners 22 which are supplied with fuel by pipes 24 which lead from the source of fuel, not shown, and with combustion air through ducts 26.

The flue gases travel through inclined flue 34 in which is interposed a boiler 36 which uses the heat component of the flue gases to generate steam. Due to the high temperature of the flue gases, steam at 900 pounds pressure can be generated, but it will be noted that, while this fairly high pressure steam is being generated, the temperature of the boiler tubes is held at about 530° F. and, therefore, the particles of copper in the flue gases will not adhere to the exterior of the tubes. After giving up most of their heat component to the water in the boiler, the flue gases pass into an electro-magnetic precipitation or other separator 38 where the particles of copper are reclaimed and fed back to the furnace.

In conventional installations, at least some of the flue gases leave the air preheater at a temperature of about 400° F., and engineering calculations show that, if the combustion air is delivered to the furnace at about 400° F., the production rate will fall off by about 35%. In other words, the extraction of heat from the flue gases reaches the point of diminishing returns and the combustion air leaving the preheater must be heated up to about 700° F. if efficiency is to be maintained. But, if the preheated air has to be further heated, a conventional installation will have to meet the cost of two air preheaters as well as the cost of further reheating the already preheated air if the loss in production because of the relatively low temperature of the conventional preheated combustion air is to be avoided.

Because, according to my invention the residual heat of the flue gases after passing through the boiler tubes is not used to preheat the combustion air, I can extract that degree of heat from the flue gases which is compatible with optimum production of steam and calculations show the cost of installing and maintaining the direct fired preheater 28 is much less than the cost of building and maintaining a single conventional air preheater, and that, by using the heat component which would conventionally be used to preheat combustion air to make steam, I can produce more steam and higher pressure steam than, other things being equal, can be produced by comparable conventional installation.

From the foregoing it will be seen that I have devised a new method of smelting by which combustion air is heated to about 700° F. to insure maximum efficiency; that by proportioning the boiler relative to the heat component of the flue gases, steam is produced at an optimum rate while the temperature of the surface of the boiler is kept low enough to prevent adhesion of melted particles, and that large, and very expensive, conventional preheaters is eliminated.

From the foregoing it will be seen that by using burner 28, I can insure that the temperature of the combustion air will not fall below that required for best efficiency; that by proportioning the boiler relative to the heat component in the flue gases I extract maximum heat while keeping the surface of the boiler low enough to prevent adhesion thereto of the particles of metal carried by the flue gases, and that I eliminate the conventional air preheaters, the cost of installing what is many times the cost of auxiliary burner 28 and the cost of maintaining which preheaters is many times greater than the cost of operating burner 28.

What I claim is:

The method of smelting ore in a reverberatory furnace, which method includes heat-exchanging the combustion gases issuing from said furnace with a heat absorbing surface having a heat absorbing capacity which maintains the temperature of said surface below the melting temperature of the ore to prevent ore particles carried by said combustion gases from adhering to said surface, and preheating the combustion air by means of a separate burner.

References Cited in the file of this patent

UNITED STATES PATENTS

| | | |
|---|---|---|
| 475,351 | Siemens | May 24, 1892 |
| 655,139 | Wellman et al. | July 31, 1900 |
| 1,896,178 | Kuzell | Feb. 7, 1933 |
| 2,035,016 | Simcox et al. | Mar. 24, 1936 |
| 2,671,724 | Kompart | Mar. 9, 1954 |
| 2,786,748 | Delavel | Mar. 26, 1957 |